US006363248B1

(12) United States Patent
Silverman

(10) Patent No.: US 6,363,248 B1
(45) Date of Patent: Mar. 26, 2002

(54) INTELLIGENT CELLULAR FORWARDING SYSTEM

(75) Inventor: David Phillip Silverman, Somerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,920

(22) Filed: Dec. 28, 1998

(51) Int. Cl.⁷ ................................................. H04M 3/54
(52) U.S. Cl. ........................................ 455/417; 455/445
(58) Field of Search .............................. 455/414, 417, 455/445, 435, 557

(56) References Cited

U.S. PATENT DOCUMENTS

| | | | |
|---|---|---|---|
| 4,752,951 A | | 6/1988 | Konneker .................... 379/211 |
| 5,243,645 A | * | 9/1993 | Bissell ......................... 379/211 |
| 5,428,663 A | | 6/1995 | Grimes et al. ................. 379/57 |
| 5,533,097 A | * | 7/1996 | Crane .............................. 379/58 |
| 5,550,907 A | * | 8/1996 | Carlsen ........................ 379/207 |
| 5,664,003 A | | 9/1997 | Foladare et al. ............. 455/459 |
| 5,732,383 A | | 3/1998 | Foladare et al. ............ 701/117 |
| 5,793,859 A | * | 8/1998 | Matthews ................... 379/220 |
| 5,924,027 A | * | 7/1999 | Valentine .................... 455/417 |
| 5,978,673 A | * | 11/1999 | Alperovich ................. 455/417 |
| 6,091,948 A | * | 7/2000 | Carr ............................ 455/414 |

\* cited by examiner

Primary Examiner—Daniel Hunter
Assistant Examiner—Nick Corsaro
(74) Attorney, Agent, or Firm—Darby & Darby

(57) ABSTRACT

An intelligent call forwarding system for routing incoming calls to at least one of a plurality of alternate communication devices when a called party cellular communication device installed in a vehicle is unavailable to directly receive the call. The system includes a plurality of cell sites disposed at predetermined geographical locations for providing cellular communication service to the called party cellular communication device. An active cell site that provides cellular communication service to the called party cellular communication device is stored in a memory device. Each cell site is related to at least one alternate communication device that is nearest in geographical location thereto. When an incoming call is received and the cellular communication device is "unavailable", a cellular central office selects an alternate communication device that is mapped to the most recent active cell site stored in the memory device, and the incoming call is forwarded to the selected alternate communication device via a network. In a preferred embodiment the memory device stores a history of most recent active cell sites and determines the direction of travel of the vehicle therefrom. The system can automatically and intelligently predict which alternate communication device to forward the incoming call to based on the direction of travel and the most recent active cell site.

14 Claims, 4 Drawing Sheets

INTELLIGENT CELLULAR FORWARDING SYSTEM

FIELD OF THE INVENTION

The present invention relates to an intelligent cellular forwarding system and a method for using the same.

DESCRIPTION OF RELATED ART

Call forwarding schemes are well known and widely used in telephone communication systems wherein a called party, knowing that they will not be at a particular communication device, specifies in advance one or more alternate communication devices to which an incoming call should be forwarded. The alternate communication devices in conventional call forwarding schemes may be identified in several ways. For example, the called party may provide a predetermined list of all possible alternate communication devices at which the called party may be reached. Preferably, the list of possible alternate communication devices are prioritized based on the frequency or probability of the called party being at a particular location. This, however, is inefficient in that the incoming call is forwarded to an alternate communication device according to a fixed priority order so that no means are provided for predicting in advance the communication device to which the called party most likely is located based on the location of the called party.

Instead of providing a list of all possible alternate communication devices, a single communication device may be specified to which all incoming calls are to be forwarded. This approach, however, is disadvantageous in that the called party is required to continuously update identification of the alternate communication device to which the incoming calls should be forwarded each time the called party changes location.

These conventional call forwarding schemes are disadvantageous in that they are "dumb" because they require the called party to identify their intended whereabouts in advance, either generally or specifically on a continuous basis. Accordingly, conventional call forwarding techniques fail to provide any means to automatically and intelligently predict in advance a particular communication device at which the called party most likely can be reached without continuous input from the called party.

It is therefore desirable to develop an intelligent call forwarding system in which the communication device to which all incoming calls are to be forwarded is automatically predicted in advance based on the location of the called party.

SUMMARY OF THE INVENTION

The present invention is directed to an intelligent call forwarding system for routing incoming calls to at least one of a plurality of alternate communication devices when the incoming call is not able to be transmitted directly to the called party cellular communication device. The call forwarding system in accordance with the present invention is "intelligent" in that it tracks the vehicle along its path of travel by monitoring the cell site that currently provides communication service to the called party cellular communication device. By tracking the history of most recent active cell sites, when the incoming call can not be transmitted directly to the called party cellular communication device, the system can automatically predict an alternate communication device where the subscriber is most likely to be reached and route the call accordingly.

In a preferred embodiment, the intelligent call forwarding system in accordance with the present invention includes a plurality of cell sites for providing communication service to the called party cellular communication device. Information from the cell site that is currently providing cellular communication service to the called party cellular communication device is stored in a memory device. A cellular central office selects at least one of the plural alternate communication devices based on the stored most recent active cell site, and the incoming call is forwarded via a network to the selected alternate communication device based on the stored most recent active cell site, when the called party cellular communication device is unavailable.

Furthermore, the present invention is directed to a method for using the intelligent call forwarding system described in the previous paragraph. The cell site that is currently providing communication service to the called party cellular communication device is monitored as the vehicle travels and information regarding the current active cell site is stored in the memory device. At least one of the plural alternate communication devices are selected based on the most recent active cell site stored in the memory device. When the called party cellular communication device is unavailable, the incoming call is forwarded to the selected alternate communication device.

Alternatively, instead of storing only the most recent active cell site, a history of most recent active cell sites, including the most recent active cell site, may be stored in the memory device and the direction of travel of the vehicle may be determined therefrom. Then, when the current active cell site becomes inactive because the cellular communication device is no longer available, the selection of the alternate communication device to which the incoming call is forwarded is based on the most recent active cell site and the direction of travel of the vehicle.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
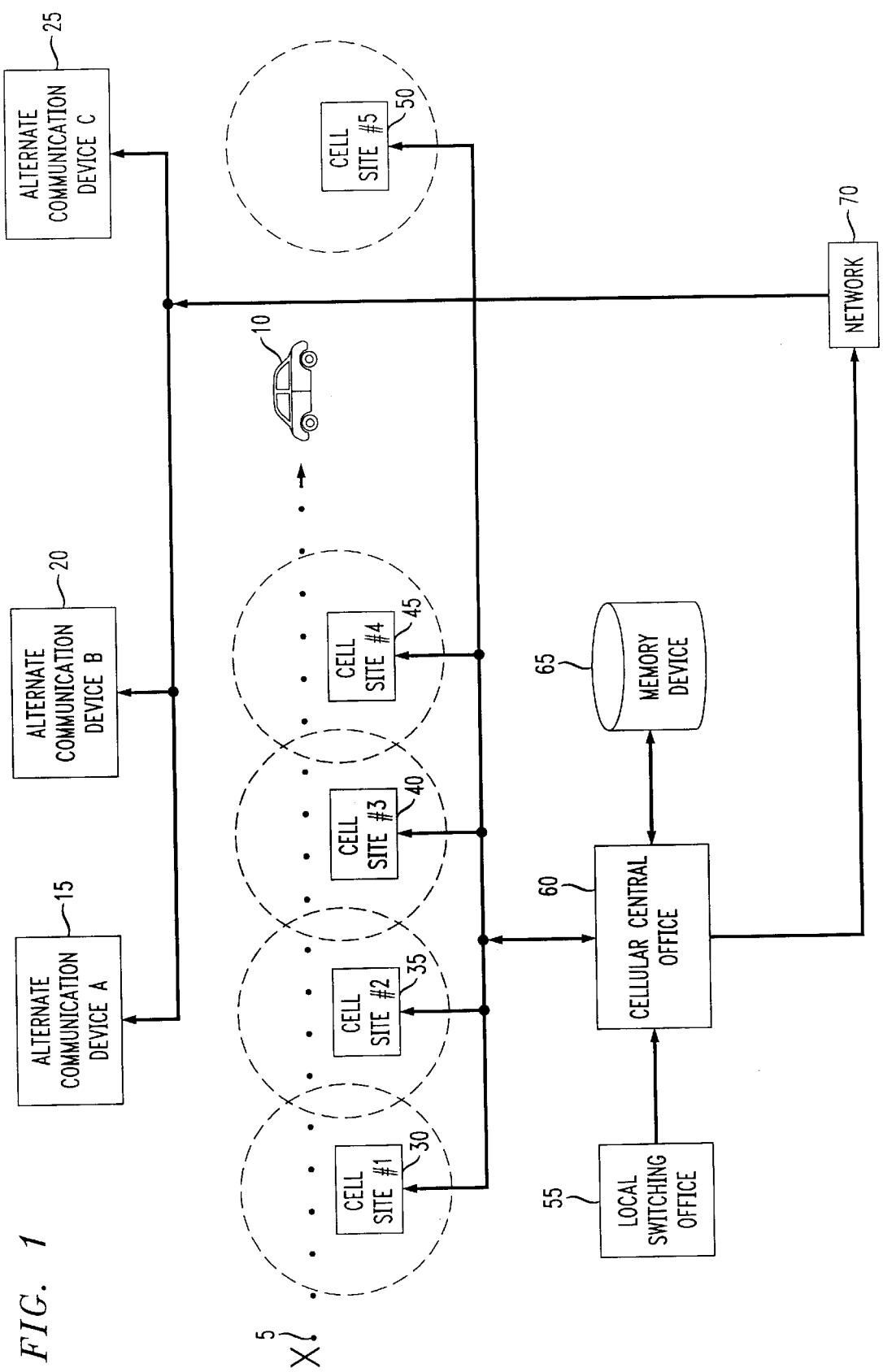
FIG. 1 is an example of the intelligent call forwarding system in accordance with the present invention.

A preferred embodiment of an intelligent call forwarding system for a cellular communication system in accordance with the present invention is shown in FIG. 1. A vehicle 10, such as an automobile, has a called party cellular communication device (not shown separately) installed therein. By way of example, in FIG. 1 three alternate communication devices 15, 20, 25 are shown. It should be noted, however, that the present invention may be used with any number of two or more alternate communication devices. The alternate communication devices 15, 20, 25 represent all possible communication devices identified by the called party to which an incoming call may be forwarded. Each alternate communication device is preferably a private branch exchange (PBX) communication device. It is, however, within the intended scope of the invention to use other types of communication devices.

In a conventional cellular communications system stationary cell sites are installed at predetermined geographical locations. Each cell site provides communication service to the called party cellular communication device while in its respective geographical service range. By way of example, five cell sites 30, 35, 40, 45, 50 are shown in FIG. 1, however, any number of cell sites may be used depending on such factors as the geographical range of communication service provided by each cell site and the overall size of the area being serviced.

In a preferred embodiment, incoming calls are received by a local switching office 55 and transmitted to a central cellular office 60. The cell sites 30, 35, 40, 45, 50 are connected to a memory device 65 via the central cellular office 60. A network 70 is interposed between the cellular central office and each of the alternate communication devices. Memory device 65 stores information such as the called party identification, the time, the history of the N most recent active cell sites (where N is an integer greater than or equal to one), and a list of all possible alternate communication devices to which the incoming call may be forwarded. Each alternate communication device is related or mapped to at least one cell site nearest in distance thereto. Table 1 is an exemplary look-up-table of the mapping of each alternate communication device and its associated nearest cell site.

TABLE 1

Mapping of Alternate Communication Devices and Nearest Cell Site

| ALTERNATE COMMUNICATION DEVICE | NEAREST CELL SITE |
| --- | --- |
| A | 1, 2, 3 |
| B | 4 |
| C | 5 |

In addition to storing the most recent active cell site, the memory device 65 may store a history of most recent active cell sites. Preferably, the memory device 65 stores a predetermined number of N most recent active cell sites (where N is greater than or equal to one), including the most recent active cell site. For example, if N is equal to three the memory device will store the most recent, second most recent, and third most recent active cell sites.

The called party cellular communication device is "available" when the device is in the geographical range of communication service of a cell site and the device itself is "turned on". The called party cellular communication device is "turned on" when the vehicle itself is turned on (assuming it is powered by the vehicle electrical system), or when the vehicle is turned off, but a call is in progress, in which case the called party cellular communication device continues to be powered by the vehicle electrical system and remains on even though the vehicles has been turned off. If the called party cellular communication device is "available", then the incoming call is transmitted directly to the device.

On the contrary, the called party cellular communication device is "unavailable" when the device is outside the geographical range of communication service of any cell site or the device itself is "turned off". The device is "turned off" when the vehicle itself is turned off and a call is not currently in progress. If the called party cellular communication device is "unavailable", then the incoming call is routed through the network 70 to the alternate communication device, or set of devices, nearest the current active cell site based on control signals from the central cellular office. In an alternative embodiment, instead of routing the incoming call based on the control signals from the central cellular office 60, the network 70 itself may include control circuitry for routing the incoming call.

As the vehicle 10 and the called party cellular communication device installed therein travel along a path 5, as denoted by the dotted line, the location of the device is monitored by the stationary cell sites 30, 35, 40, 45, 50. While the vehicle and called party cellular communication device installed therein are turned on and are within the geographical range of communication service provided by a particular cell site, that cell site becomes "active" and is in substantially constant communication with the device. At any point in time, only one cell site, if any, is in "active" communication with the called party cellular communication device. The current active cell site is stored in the memory device 65 as the most recent active cell site. Meanwhile, as the vehicle continues along its path of travel, the current active cell site changes as communication service is provided to the called party cellular communication device by different cell sites depending on the geographical location of the device. Each time the current active cell site changes the information is updated in the memory device 65.

By way of example, in FIG. 1 the first four cell sites 30, 35, 40, 45 are arranged so that their respective geographical ranges of communication service (as denoted by the dashed circles) are contiguous to one another, thereby providing substantially continuous communication service to the called party cellular communication device. Cell sites #4 and #5, however, are non-contiguous, in that there is a predefined area therebetween in which the cellular communication service is outside the range of either cell site and is thus "unavailable".

Initially, while the vehicle 10 is at location "X", no cellular communication service is available. As the vehicle travels to the right it enters the geographical range of communication service of cell site #1, this cell site provides communication service to the called party cellular communication device. Cell site #1 transmits a signal to the memory device 65 via the central cellular office 60 indicating that it is the current active cell site and the information is updated accordingly as the most recent active cell site. In the example shown in FIG. 1, since cell sites #1–4 are contiguous, as the vehicle travels between cell sites #1 and #2 the called party cellular communication device exits from the geographical service range of cell site #1 and enters the service range of cell site #2. When communication service is switched from cell site #1 to cell site #2 a signal is transmitted to the memory device 65 via the cellular central office 60 indicating that cell site #2 is the new most recent active cell site. This process continues in a similar manner as the vehicle travels in and out of the respective geographical service ranges of cell sites #1–4. Each time communication service is provided to the called party cellular communication device by a different active cell site the information is updated in the memory device 65.

Since the geographical ranges of communication service of the first four cell sites are contiguous, if the called party cellular communication device is "turned on" while in one of these ranges (that is, if the called party cellular communication device is "available"), then an incoming call received at the local switching office 55 is transmitted directly to the called party cellular communication device via the respective active cell site. For example, if the called party cellular communication device is "available" while in the geographical range of communication service of cell site #4, an incoming call received at the local switching office 55 is directly transmitted to the called party cellular communication device via cell site #4. In this example, since the vehicle has traveled in the geographical range of communication service of cell sites #1–3 prior to entering the geographical range of communication service of cell site #4, the history of active cell sites stored in the memory device identifies cell site #4 as the most recent active cell site, cell site #3 as the second most recent active cell site, and cell site #2 as the third most recent active cell site, assuming that the memory device 65 stores the history of the three most recent active cell sites.

On the other hand, if the called party cellular communication device is "unavailable", then the incoming call is forwarded to the alternate communication device nearest to the most recent active cell site stored in the memory device 65. In the example provided above, if after the vehicle enters the geographical range of the communication service of cell site #4, it exits from the geographical service range, then the called party cellular communication device becomes "unavailable", thereby preventing direct transmission of an incoming call to the device. If an incoming call is received at the local switching office 55 while the called party cellular communication device is located between cell sites #4 and #5 and outside the geographical range of service of either site, then the call is routed to the alternate communication device nearest to the most recent active cell site stored in the memory device 65. Specifically, the central cellular office 60 retrieves from the memory device cell site #4 as the most recent active cell site. This information is used to determine the nearest alternate communication device to cell site #4. Based on the information provided in Table 1, alternate communication device B is nearest to cell site #4. As a result, the central cellular office 60 transmits control signals to the network 70 to route the incoming call to alternate communication device B.

Not every cell site will have a related alternate communication device. Furthermore, even if the situation in which the most recent cell cite has a related alternate communication device, it is possible that the called party is not at the alternate communication device at which the call is forwarded so that the incoming call goes unanswered. In these situations, it is preferable to specify a predetermined default communication device to route the incoming call. The predetermined default device is typically one of the alternate communication devices. Alternatively, the predetermined default communication device may be a separate device from the alternate communication devices. Thus, if a related alternate communication device is not identified for a particular cell site or if the incoming call goes unanswered at the alternate communication device to which it has been forwarded for a predetermined period of time, then the incoming call will be routed to the predetermined default device.

In a preferred embodiment, after the alternate communication device nearest in geographical range to the most recent active cell site is ascertained, a comparison is made whether the distance between the nearest alternate communication device and the most recent active cell site is greater than the distance between the most recent active cell site and a predetermined default communication device. If the distance between the most recent active cell site and its nearest alternate communication device is less than the distance between the most recent active cell site and the predetermined default communication device, then the incoming call is forwarded to the nearest alternate communication device. Otherwise, the incoming call is forwarded to the predetermined default communication device.

The previous example illustrates one situation in which the called party cellular communication device is "unavailable", that is, when the called party cellular communication device is outside the geographical range of communication service of any cell site. In another situation, the called party cellular communication device may be within the geographical range of communication service of a cell site, yet "unavailable" because the device itself is turned off. Once again, referring to FIG. 1, the vehicle may travel from location "X" through the geographical range of communication service of cell sites #1 and #2 and enter the geographical range of communication service of cell site #3. Thereafter, if the called party cellular communication device is "turned off", that is, the vehicle itself is turned off and a call is not currently in progress, then the device is "unavailable" to complete transmission of the incoming call. Instead, the most recent active cell site, cell site #3, is retrieved from the memory device 65 and the incoming call is routed to the alternate communication device A or set of devices A and B, which are nearest cell site #3. Once again referring to Table 1, alternate communication device A is nearest to cell site #3 and, thus the central cellular office 60 will generate a control signal to route the incoming call to alternate communication device A via network 70.

Figure 2:
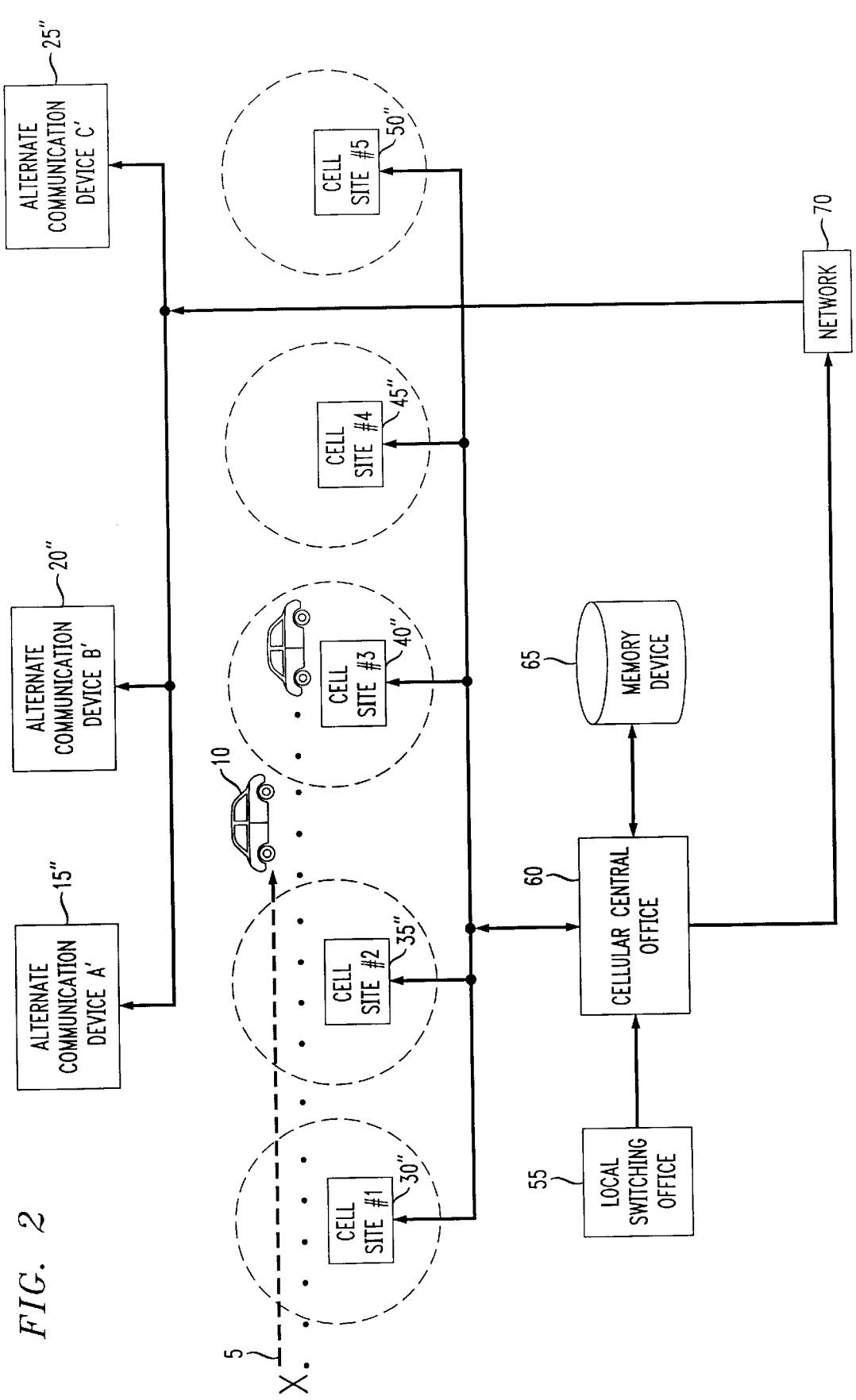
FIG. 2 is another example of the intelligent call forwarding system in accordance with the present invention.

In another embodiment of the present invention, tracking the history of active cell sites provides information to aid in determining the direction of travel of the vehicle, and may be used to select one of a plurality of alternate communication devices proximate a cell site. Specifically, the history of N most recent active cell sites stored in the memory device may be used to determine the direction of travel of the vehicle and, in turn, predict the alternate communication device to which the incoming call should be forwarded. The number of most recent active cell sites stored in the memory device may be one or more as desired. For example, in FIG. 2 if the vehicle travels from point X through cell sites #1 and #2 towards cell site #3, and then becomes "unavailable", either in a no coverage area between cell sites #2 and #3 or while in cell site #3, it is desirable to predict which alternate communication device, A' or B', to forward the incoming call. Since in traveling from left to right the vehicle must pass through cell site #3 on its path to destination B', it may be inferred that the subscriber is not at the destination in which alternate communication device A' is located if the vehicle does not enter cell site #3. Therefore, if the most recent active cell site stored in memory is cell site #2, that is, the vehicle does not enter cell site #3 (as denoted by the dashed line), then it may be inferred that the subscriber is presently at the location of alternate communication device A' and the incoming call is forwarded thereto. On the other hand, if the most recent active cell site stored in memory is cell site #3, that is, the vehicle enters cell site #3 (as denoted by the dotted line), then it may be inferred that the subscriber is presently at the location of alternate communication device B' and the incoming call is forwarded thereto. It should be noted that this analysis describes the situation in which the vehicle travels in a direction from left to right, wherein the direction of travel is determined based on the history of active cell sites stored in the memory device. A different analysis would take place if the vehicle were traveling from right to left.

Figure 3:
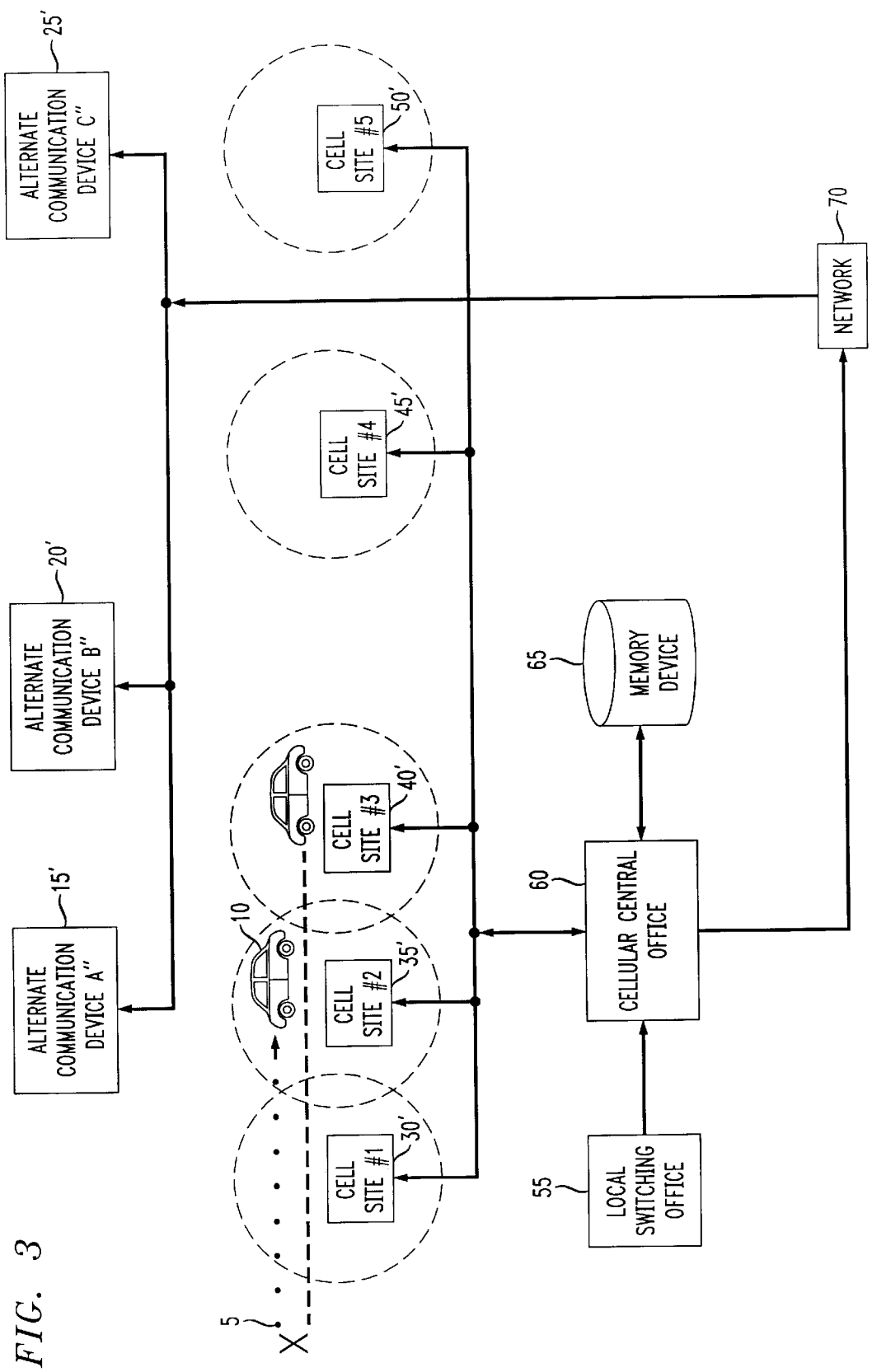
FIG. 3 is still another example of the intelligent call forwarding system in accordance with the present invention.

In another example shown in FIG. 3, the respective service ranges of cell sites #1–3 are contiguous and overlapping. The locations of two alternate communication devices A" and B" are adjacent to cell site #3. The direction of travel of the vehicle may be used to predict which of these two adjacent alternate communication devices to forward the incoming call. When traveling in a direction from left to right, if the vehicle enters the service range of cell site #2 without entering the service range of cell site #3, it may be inferred that the subscriber is currently at the location of alternate communication device A" and all incoming calls are forwarded thereto. Otherwise, if a called party cellular communication device becomes "unavailable" after the vehicle has traveled through the service range of cell sites #2 and #3, then it may be inferred that the subscriber is currently at the location of alternate communication device B" and all incoming calls are forwarded thereto.

Figure 4:
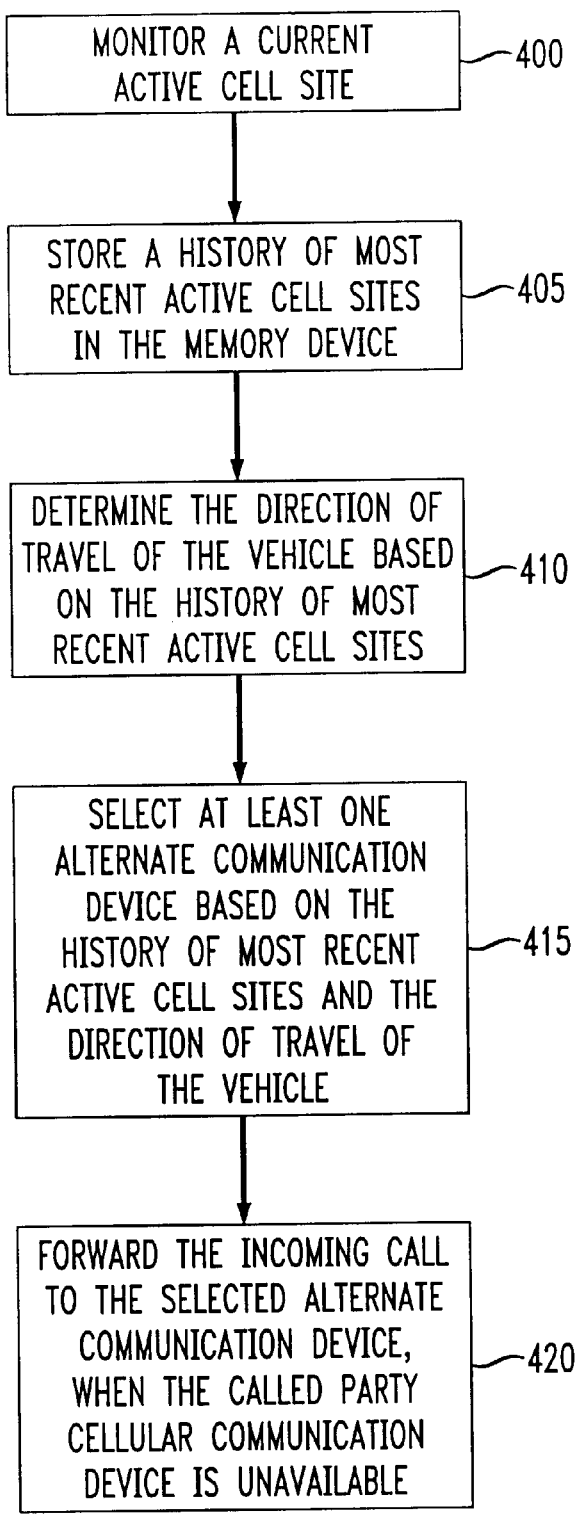
FIG. 4 represents a flow chart of the method of using the intelligent call forwarding system in accordance with the present invention.

FIG. 4 shows a flow chart of the method for using a preferred intelligent call forwarding system in accordance with the present invention. In step 400 an active cell site that is currently providing communication service to the called party cellular communication device is continuously monitored as the vehicle travels. The current active cell site transmits information via the cellular central office 60 to the memory device which stores, in step 405, a history of a predetermined number of most recent active cell sites. In step 410 a direction of travel of the vehicle is determined based on the stored history of the most recent active cell sites. At least one alternate communication device is then automatically selected in step 415 by the cellular central office based on the stored history of the most recent active cell sites and the direction of travel of the vehicle. Finally, in step 420, the incoming call is forwarded to the selected alternate communication device when the called party cellular communication device is "unavailable".

Thus, while there have been shown, described and pointed out fundamental novel features of the invention as applied to a preferred embodiment thereof, it will be understood that various omissions, substitutions and changes in the form and details of the devices illustrated, and in their operation, may be made by those skilled in the art without departing from the spirit and scope of the invention. For example, it is expressly intended that all combinations of those elements and/or method steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for routing incoming calls in a cellular communication system to at least one of a plurality of alternate communication devices when a movable called party cellular communication device is unavailable, said method comprising the steps of:

monitoring active cell sites providing communication service to the called party cellular communication device;

storing a history of information about a predetermined number of most recent active cell sites in a memory device;

automatically selecting at least one of the plural alternate communication devices based on the stored history of most recent active cell sites stored in the memory device by determining a direction of travel of the vehicle based on the history of most recent active cell sites; and forwarding an incoming call to the at least one alternate communication device selected, when the called party cellular communication device is unavailable.

2. A method in accordance with claim 1, wherein said selecting step comprises selecting the alternate communication device based on the stored most recent active cell site and the direction of travel of the vehicle.

3. A method in accordance with claim 1, further comprising relating each of said alternate communication devices to the cell site nearest in geographical location thereto.

4. A method in accordance with claim 3, wherein said selecting step comprises automatically selecting the nearest alternate communication device related to the most recent active cell site stored in the memory device.

5. A method in accordance with claim 1, wherein said selecting step comprises automatically selecting a predetermined default communication device, when the most recent active cell site stored in the memory device does not have a related alternate communication device.

6. A method in accordance with claim 1, further comprising:

determining whether a predetermined period of time has expired since the incoming call has been forwarded to the selected alternate communication device without being answered; and routing the incoming call to a predetermined default communication device, when the predetermined period of time has expired.

7. An intelligent cellular communication call forwarding system with a plurality of cell sites for providing communication service to a movable called party cellular communication device, said system receiving an incoming call to the called party cellular communication device and routing the incoming call to at least one of a plurality of alternate communication devices where calls for the called party cellular communication device are to be directed when it is unavailable, said alternate communication devices being associated with particular cell sites, comprising:

a memory device for storing a history of information about a predetermined number of most recent active cell sites providing communication service to the called party cellular communication device;

a cellular central office for automatically selecting at least one of the plural alternate communication devices when the called party cellular communication device is unavailable based on the stored history of most recent active cell sites, said cellular central office determines a direction of travel of the vehicle based on the history of most recent active cell sites; and a network for routing the incoming call to at least one of said plural alternate communication devices based on the stored most recent active cell site, when the called party cellular communication device is unavailable.

8. A system in accordance with claim 7, wherein said cellular central office selects at least one of said plural alternate communication devices based on the stored most recent active cell site and the direction of travel.

9. A system in accordance with claim 7, wherein said cellular central office relates each alternate communication device to a cell site nearest on location thereto.

10. A system in accordance with claim 9, wherein said cellular central office automatically selects the nearest alternate communication device related to the stored most recent active cell site.

11. A system in accordance with claim 10, wherein said memory device stores a predetermined default communication device.

12. A system in accordance with claim 11, wherein said cellular central office automatically selects the predetermined default communication device, when the most recent active cell site stored in said memory device does not have a related alternate communication device.

13. A system in accordance with claim 11, wherein said cellular central office determines whether a predetermined period of time has expired since the incoming call has been forwarded to the selected alternate communication device without being answered, and routes the incoming call to the predetermined default communication device, when the predetermined period of time has expired.

14. An intelligent cellular communication call forwarding system for routing incoming calls to at least one of a plurality of alternate communication devices when a called party cellular communication device is unavailable, comprising:

means for monitoring an active cell site providing communication service to the called aprty cellular communication device;

means for storing a history of information about a predetermined number of most recent active cell sites;

means for selecting at least one fo the plural alternate communication devices based on the history of most recent active cell sites in said storage means, said means for selecting including means for determining a direction of travel of the vehicle based on the history of most recent active cell sites; and means for forwarding an incoming call to the selected alternate communication device, when the called party cellular communication device is unavailable.

* * * * *